United States Patent Office 3,096,253
Patented July 2, 1963

3,096,253
ENZYME PRODUCTION
Won Young Koh, Bound Brook, and Ralph A. Messing, Somerville, N.J., assignors to Ethicon, Inc., a corporation of New Jersey
No Drawing. Filed Nov. 25, 1957, Ser. No. 698,880
12 Claims. (Cl. 195—62)

This invention relates to keratinolytic enzymes. More particularly, it concerns keratinases and methods for their preparation.

Keratinases, as the name implies, are enzymes which are capable of splitting keratin, a scleroprotein existing as a constituent in mammalian epidermis, hair, wool, nails, horns, hooves and the enamel matrix of teeth. Although the existence of keratinases is widespread in nature, there is an obvious dearth of information in the literature regarding their isolation. Aside from a few reports dealing with observations on certain special keratinases, there is little available knowledge concerning practical methods for obtaining these enzymes.

A process has now been discovered for producing keratinolytic enzymes by cultivating, under aerobic conditions, certain Aspergilli molds. In accordance with one embodiment of the novel process, a keratinase-producing strain of Aspergillus, preferably the species *flavus* or *niger*, is cultivated in a semi-synthetic aqueous medium under submerged aerobic conditions for a period of from about 72 hours to about 7 days, and the elaborated enzyme is separated therefrom by one of several different procedures.

The keratinase-producing Aspergilli of the present invention were isolated from commercially available keratin. They have been deposited with the American Type Culture Collection, Washington, D.C., and have been assigned the following designations: *Aspergillus flavus*: ATCC No. 13003; *Aspergillus niger*: ATCC No. 13004. The cultural characteristics of the new strains of Aspergilli are as follows.

*Aspergillus flavus*:
 Mycophil agar: yellow to green colonies
 Czapek agar: bright greenish-yellow to deep yellow-green colonies
 Conidial heads: yellow-green in young fruiting bodies
 Conidiophores: rough and colorless, approximately 300 to 700 micra in diameter
 Heads: columnar
 Sterigmata: double
 Sclerotia: none
 Conidia: slightly rough with slight greenish color, approximately 3.9 micra in diameter
 Growth: equal at 25° C. and 37° C.

*Aspergillus niger*:
 Mycophil and Czapek agar: black to purple-brown colonies
 Conidial heads: brownish black to carbon black, large and globose
 Conidiophores: smooth, yellow tinged, with splitting in the upper position
 Conidia: rough, with diameter of approximately 3.5 micra
 Sterigmata: in two series
 Sclerotia: none
 Growth: equal at 25° C. and 37° C.

The cultivation of keratinase-producing strains of Aspergilli preferably takes place in aqueous, semi-synthetic nutrient media at temperatures from about 24° C. to about 37° C., on the surface of the quiescent fluid, in shaker flasks or in deep tanks aided by agitation and aeration. For large scale commercial production, the use of deep tanks with aeration and constant agitation may be employed.

In general, the fermentation is continued until substantial keratinolytic activity is imparted to the medium, a period from about 72 hours to about 7 days being sufficient. Aeration of the medium in tanks for submerged growth is maintained at the ratio of about one volume of free air per volume of broth per minute. Agitation may be maintained by suitable types of commercially available devices. Naturally, aseptic conditions must be maintained throughout the transfer of the inoculum and throughout the growth of the microorganism.

Although we do not wish to be bound to any theory regarding the mechanism of enzyme production according to our novel process, it is believed that the enzymes resulting therefrom are adaptive. Therefore, it is essential that there be present in the fermentation medium a source of protein rich in sulfur-containing amino acids and disulfide bonds, not only for the sustenance of the microorganism, but also for maximum enzyme production. Convenient sources for assimilable proteins rich in sulfur-containing amino acids and disulfide bonds are the so-called keratins, for example: hair, feathers, wool, horn meal, hoof meal, horn-hoof meal and, preferably partially degraded wool. The term "partially degraded wool" as used in this invention is intended to mean a product prepared from wool by conventional, well-known alkali and heat treatment, being soluble to the extent of 10% in water and aqueous alkaline buffers, and analyzing as follows: 15.3% nitrogen, 4.1% sulfur, 7.0% moisture and 0.5% ash.

The fermentation broth must have present in it minor quantities of certain inorganic elements for effective growth of the microorganism. For this purpose it is desirable that there be included, substantially free from impurities, sodium chloride, magnesium sulfate, calcium chloride, ferrous sulfate, zinc sulfate, potassium acid phosphate, dibasic potassium phosphate and/or similar salts. The pH of the fermentation medium may be varied within wide limits without noticeably detracting from yields. Effective production may be obtained within the range of about 5.0 to about 9.0. Optimal yields of enzyme are obtained within the approximate range of 6.5 to 7.5, preferably 6.8 to 7.2, i.e. near neutrality. Control of pH within the desired limits is conveniently accomplished by varying the quantities of dibasic potassium phosphate. Where higher pH levels are desired, the amount of dibasic phosphate is increased; if a lower pH range is desired, the phosphate is replaced with acetate buffer.

After the fermentation has continued for a sufficient period of time, as determined by assay of the broth for keratinase content, the mycelium is separated from the broth by suitable means such as filtration or centrifugation. Although the filtrate may be used as such, or in its lyophilized form, it may be desirable to obtain the enzymes in a more purified state. This may be suitably accomplished through the use of adsorption materials or through precipitation.

Separation of the keratinases by adsorption is effected by adding a carrier such as silica gel, activated alumina, activated magnesium silicate, clay, wood flour or mixtures of such materials to the culture medium separating the water by filtration or evaporation under reduced pressure and eluting the enzyme with an appropriate solvent.

Purification by precipitation is suitably accomplished by salting out the enzymatic activity with various precipitants such as saturated ammonium sulfate; esters such as methyl acetate, ethyl acetate, amyl acetate, etc.; aqueous lower alkanols such as methanol, ethanol, propanol, isopropanol and butanol; acetone, or dioxane. The precipitate is collected and dried at a low temperature.

Keratinolytic activity may be determined by gravimetric assay against a standard keratin substrate. A convenient method is the following: A 50 mg. quantity of keratin substrate, e.g. partially degraded wool, is placed into a 25 ml. flask, a volume of 5 ml. of culture filtrate (or aqueous solution of purified enzyme) is added, the flask is stoppered and incubated at 37° C. for 18 hours. The undissolved keratin is recovered by filtration through a previously tared sintered glass filter. The filter and keratin are dried at 110° C. for two hours and reweighed. The difference between weight loss of filtrate-treated keratin and untreated keratin represents the weight loss due to enzymatic digestion. A keratin control, employing no keratinase, is also run. Enzymatic activity can be conveniently expressed in terms of percent in accordance with the following formula:

$$A = 1 - \left(\frac{W_1}{W_2}\right) \times 100$$

$W_1$ = weight of keratin after enzymatic treatment
$W_2$ = weight of keratin control
$A$ = percent dissolution of keratin due to enzymatic action A convenient way to express the keratinolytic activity of the enzymes obtained according to the present invention is in terms of "keratinase units." This may be accomplished with the following equation:

Keratinase unit
$$= \frac{\text{Percent keratin dissolved by assay} \times 100}{\text{ml. (or mg.) of enzyme employed}}$$

Thus, where an enzyme assay of, for example, 75% is obtained (supra) and a 5 ml. volume of culture filtrate (or aqueous solution of enzyme) is employed in the assay, the number of units of keratinase activity per milliliter of solution is 1500.

The keratinases produced by the process of this invention have a wide variety of practical applications, these being, inter alia, in the dehairing of hides in leather manufacture; the breaking down of keratin and reconstitution into textile fabrics; as ingredients in depilatory compositions for use on the animal organism; as collateral substances in debriding, corn-removing and de-feathering formulations. An illustrative hair remover composition, especially adaptable for use on laboratory animals, is one containing about 1% lyophilized keratinase (365 units keratinase activity per mg.) in an aqueous phosphate 0.1 M buffer adjusted to pH 7.5.

The following examples are given as illustrations of the manner in which the process of our invention may be carried out. They are not to be construed as limiting our invention.

*Example I*

*Aspergillus flavus*, ATCC No. 13003, was grown on the surface of Mycophil agar in Kolle flasks containing 60 ml. of agar per flask at an incubation temperature of 37° C. for a period of three days. The growth in each flask was washed with a 30 ml. aqueous 1% solution of a nonionic detergent—alkyl aryl polyether alcohol (Triton X–100). Flasks containing 500 ml. of culture medium were each inoculated with 5 ml. of organism suspension from the Kolle flasks. The culture medium had the following composition: NaCl, 5.0 g.; $MgSO_4 \cdot 7H_2O$, 1.0 g.; $CaCl_2$, 0.04 g.; $FeSO_4 \cdot 7H_2O$, 0.02 g.; $ZnSO_4 \cdot H_2O$, 0.01 g.; $K_2HPO_4$, 22 g.; $KH_2PO_4$, 2.8 g.; partially degraded wool, 1.0 g.; distilled water up to one liter. The final pH of the medium was 7.2. The inoculated flasks were incubated with constant shaking at 37° C., daily sampling being made at intervals during the incubation period. All samples were Seitz filtered and analyzed for keratinolytic activity. The results were as follows.

| Hours of incubation: | Percent assay |
| --- | --- |
| 24 | — |
| 72 | 53.8 |
| 96 | 70.0 |
| 168 | 71.8 |
| 190 | 52.5 |
| 215 | 46.0 |
| 334 | 40.0 |

*Example II*

Fermentor cultures of *Aspergillus flavus*, ATCC No. 13003, were prepared by transferring the entire 500 ml. volume of a 4-day-old shaker flask culture (prepared as in Example I) to each fermentor containing 2,500 ml. of fresh, sterile medium having the composition set forth in Example I. The fermentors were immersed in a constant temperature 37° C. water bath, aerated at the rate of 3 liters per minute and agitated by rotary impellers at 350 r.p.m. Samples were taken at intervals during incubation, Seitz filtered and assayed for keratinolytic activity. The results were as follows.

| Hours of incubation: | Percent assay |
| --- | --- |
| 18 | 86 |
| 162 | 80 |
| 234 | 76.5 |
| 330 | 87.0 |

*Example III*

*Aspergillus niger*, ATCC No. 13004, was cultured in the same manner and under the same conditions as described in Example I. The composition of the culture medium was identical. Assay results for keratinolytic activity on periodic samples were as follows.

| Hours of incubation: | Percent assay |
| --- | --- |
| 24 | 3.3 |
| 72 | 12.0 |
| 96 | 13.0 |
| 168 | 74.8 |
| 190 | 33.0 |
| 215 | 98.0 |

*Example IV*

Fermentor cultures of *Aspergillus niger*, ATCC No. 13004, were prepared under the conditions and according to the procedure described in Example II. Assay results for keratinolytic activity on periodic samples were as follows.

| Hours of incubation | Percent assay |
| --- | --- |
| 24 | 4.5 |
| 48 | 5.0 |
| 72 | 13.0 |
| 96 | 5.0 |
| 144 | 6.0 |
| 168 | 7.0 |
| 192 | 3.5 |

What is claimed is:
1. A method for producing keratinolytic enzymes which comprises aerobically cultivating a keratinase-producing strain of fungi selected from the group consisting of *Aspergillus flavus*, ATCC No. 13003, and *Aspergillus niger*, ATCC No. 13004, in a semi-synthetic aqueous nutrient medium containing a source of protein rich in sulfur-containing amino acids and disulfide bonds and inorganic salts.

2. A method as set forth in claim 1 wherein the protein rich in sulfur-containing amino acids and disulfide bonds is keratin.

3. A method as set forth in claim 1 wherein the source of protein rich in sulfur-containing amino acids and disulfide bonds is hoof meal.

4. A method as set forth in claim 1 wherein the source of protein rich in sulfur-containing amino acids and disulfide bonds is hair.

5. A method as set forth in claim 1 wherein the source of protein rich in sulfur-containing amino acids and disulfide bonds is wool.

6. A method as set forth in claim 1 wherein the source of protein rich in sulfur-containing amino acids and disulfide bonds is feathers.

7. A method as set forth in claim 1 wherein the source of protein rich in sulfur-containing amino acids and disulfide bonds is horn meal.

8. A method as set forth in claim 1 wherein the cultivation is carried out at an approximately neutral pH.

9. A method as set forth in claim 1 wherein the cultivation is carried out at a temperature of from about 24° C. to about 37° C.

10. A method as set forth in claim 1 wherein the cultivation is carried out for a period of from about 72 hours to about 7 days.

11. A method for producing a keratinolytic enzyme fermentation broth which comprises cultivating a keratinase-producing strain of fungi selected from the group consisting of *Aspergillus flavus*, ATCC No. 13003, and *Aspergillus niger*, ATCC No. 13004, in a semi-synthetic aqueous nutrient medium containing a source of protein rich in sulfur-containing amino acids and disulfide bonds and inorganic salts, until substanatial enzymatic activity is imparted to said solution.

12. A keratinolytic enzyme produced by the process of claim 1.

References Cited in the file of this patent

UNITED STATES PATENTS

| | | |
|---|---|---|
| 2,095,273 | Wallerstein et al. | Oct. 12, 1937 |
| 2,157,969 | Rohm | May 9, 1939 |
| 2,229,420 | Neugebauer | Jan. 21, 1941 |
| 2,857,316 | Grim | Oct. 21, 1958 |

FOREIGN PATENTS

| | | |
|---|---|---|
| 351,600 | Great Britain | July 2, 1931 |

OTHER REFERENCES

Tauber: "Enzyme Technology" (1946), pages 236–237.

Vanbreuseghem: "Mycologia," vol. 44, pages 176–182 (1952).

Sumner et al.: "Chemistry and Methods of Enzymes," 3rd ed., Academic Press Inc., New York (N.Y) page 179 relied on.